(12) United States Patent
Ronner et al.

(10) Patent No.: US 8,050,060 B2
(45) Date of Patent: Nov. 1, 2011

(54) METHOD FOR OPERATING A CONVERTER CIRCUIT AND APPARATUS FOR IMPLEMENTING THE METHOD

(75) Inventors: Beat Ronner, Maisprach (CH); Osvin Gaupp, Baden (CH)

(73) Assignee: ABB Schweiz AG, Baden (CH)

( * ) Notice: Subject to any disclaimer, the term of this patent is extended or adjusted under 35 U.S.C. 154(b) by 407 days.

(21) Appl. No.: 12/406,229

(22) Filed: Mar. 18, 2009

(65) Prior Publication Data

US 2009/0257253 A1 Oct. 15, 2009

(30) Foreign Application Priority Data

Mar. 19, 2008 (EP) .................................... 08152989

(51) Int. Cl.
*H02J 1/02* (2006.01)
*G05F 1/70* (2006.01)
(52) U.S. Cl. .......................................... 363/39; 323/208
(58) Field of Classification Search .................... 363/39, 363/40, 44, 45, 84–97, 127–129, 137; 323/207, 323/208
See application file for complete search history.

(56) References Cited

U.S. PATENT DOCUMENTS

| | | | |
|---|---|---|---|
| 6,693,409 B2* | 2/2004 | Lynch et al. | 323/208 |
| 7,518,893 B2* | 4/2009 | Ponnaluri et al. | 363/62 |
| 7,710,749 B2* | 5/2010 | Conticelli et al. | 363/40 |
| 7,778,052 B2* | 8/2010 | Serpa et al. | 363/40 |
| 2009/0212641 A1* | 8/2009 | Ronner et al. | 307/105 |

FOREIGN PATENT DOCUMENTS

| | | |
|---|---|---|
| CN | 1658465 A | 8/2005 |
| CN | 101119031 A | 2/2008 |

OTHER PUBLICATIONS

European Search Report for EP 08152989.3 dated Oct. 22, 2008.

* cited by examiner

*Primary Examiner* — Jessica Han
(74) *Attorney, Agent, or Firm* — Buchanan Ingersoll & Rooney PC

(57) ABSTRACT

The disclosure specifies a method for operating a converter circuit, the converter circuit having a converter unit with a large number of drivable power semiconductor switches and with a three-phase electrical AC voltage system, in which the drivable power semiconductor switches are driven by means of a drive signal ($S_A$) formed from a control signal (($S_R$), and the control signal ($S_R$) is formed by adjusting an H-th harmonic component of system currents ($i_{NH}$) to a system current setpoint value ($i_{NHref}$), where H=1, 2, 3, . . . . In order to reduce a harmonic component in the system voltages, the system current setpoint value ($i_{NHref}$) is formed by adjusting an H-th harmonic component of system voltages ($u_{NH}$) to a predeterminable system voltage setpoint value ($u_{NHref}$), the control difference ($u_{NHdiff}$) from the H-th harmonic component of the system voltages ($u_{NH}$) and the system voltage setpoint value ($u_{NHref}$) being weighted by a system impedance ($y_{NH}$) determined with respect to the H-th harmonic component. In addition, an apparatus is disclosed for implementing the method.

21 Claims, 3 Drawing Sheets

METHOD FOR OPERATING A CONVERTER CIRCUIT AND APPARATUS FOR IMPLEMENTING THE METHOD

RELATED APPLICATION

This application claims priority under 35 U.S.C. §119 to European Patent Application No. 08152989.3 filed in Europe on Mar. 19, 2008, the entire content of which is hereby incorporated by reference in its entirety.

TECHNICAL FIELD

The disclosure relates to the field of power electronics. It is based on a method for operating a converter circuit and on an apparatus for implementing the method.

BACKGROUND INFORMATION

Known converter circuits comprise a multiplicity of drivable power semiconductor switches, which are connected to one another in a known manner in order to switch at least two switching voltage levels. Typically, such a converter circuit is connected to an electrical AC voltage system, which is in particular of three-phase design. Such converter circuits are often used in industrial installations, with the converter circuits being coupled to the power supply system and naturally with further fields of use and possible uses being conceivable.

For the operation of the converter circuit, a control apparatus is provided which has a controller unit for forming a control signal by adjusting an H-th harmonic component of system currents to a system current setpoint value and which is connected to the drivable power semiconductor switches via a drive circuit for forming a drive signal from the control signal, the H-th harmonic component being produced by the converter circuit and generally being H=1, 2, 3, . . . Typical values for H are H=5, 7, 11, 13. The drive signal is therefore used to drive the power semiconductor switches.

The abovementioned method for operating the converter circuit permits adjustment of an H-th harmonic component of the system currents to a system current setpoint value by means of the control apparatus. However, in an electrical AC voltage system, in addition to harmonic components in the system currents, it is also possible for harmonic components to occur in the system voltages, but these cannot be adjusted by means of the known method described above and therefore cannot be reduced.

SUMMARY

A method for operating a converter circuit is disclosed by means of which it is possible to reduce a harmonic component in system voltages of an electrical AC voltage system connected to the converter circuit. A further object of the disclosure is to specify an apparatus with which the method can be implemented in a particularly simple manner.

A method for operating a converter circuit is disclosed, the converter circuit having a converter unit with a large number of drivable power semiconductor switches and with a three-phase electrical AC voltage system, in which the drivable power semiconductor switches are driven by means of a drive signal ($S_A$) formed from a control signal (($S_R$), and the control signal ($S_R$) is formed by adjusting an H-th harmonic component of system currents ($i_{NH}$) to a system current setpoint value ($i_{NHref}$), where H=1, 2, 3, . . . , wherein the system current setpoint value ($i_{NHref}$) is formed by adjusting an H-th harmonic component of system voltages ($u_{NH}$) to a predeterminable system voltage setpoint value ($u_{NHref}$), the control difference ($u_{NHdiff}$) from the H-th harmonic component of the system voltages ($u_{NH}$) and the system voltage setpoint value ($u_{NHref}$) being weighted by a system impedance ($y_{NH}$) determined with respect to the H-th harmonic component.

An apparatus for implementing a method for operating a converter circuit is disclosed, the converter circuit having a converter unit with a large number of drivable power semiconductor switches and being connected to a three-phase electrical AC voltage system, with a control apparatus, which is used to generate a control signal ($S_R$) and is connected to the drivable power semiconductor switches via a drive circuit for forming a drive signal ($S_A$), the control apparatus (4) having a first controller unit for forming the control signal ($S_R$) by adjusting an H-th harmonic component of system currents ($i_{NH}$) to a system current setpoint value ($i_{NHref}$), where H=1, 2, 3, . . . , wherein the control apparatus has a second controller unit for forming the system current setpoint value ($i_{NHref}$) by adjusting an H-th harmonic component of system voltages ($u_{NH}$) to a predeterminable system voltage setpoint value ($u_{NHref}$), the control difference ($u_{NHdiff}$) from the H-th harmonic component of the system voltages ($u_{NH}$) and the system voltage setpoint value ($u_{NHref}$) being weighted by a system impedance ($y_{NH}$) determined with respect to the H-th harmonic component.

These and further objects, advantages and features of the present disclosure are disclosed in the detailed description below relating to exemplary embodiments of the disclosure in connection with the drawing.

Figure 1:
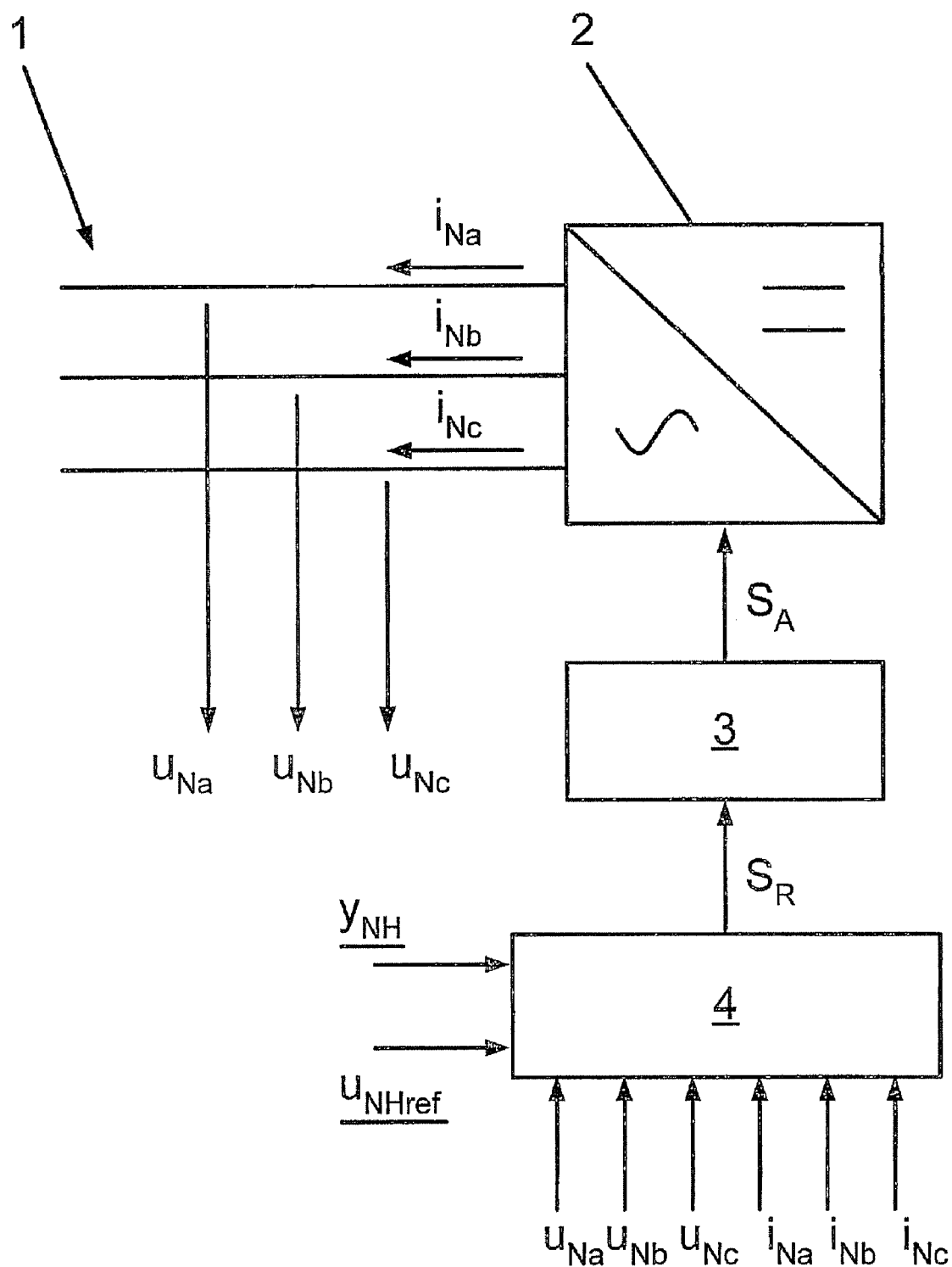
FIG. 1 shows an exemplary embodiment of an apparatus for implementing the method according to the disclosure for operating a converter circuit.

The reference symbols used in the drawing and the significance thereof are listed by way of summary in the list of reference symbols. In principle, identical parts have been provided with identical reference symbols in the figures. The exemplary embodiments described represent, by way of example, the subject matter of the disclosure and do not have a restrictive effect.

DETAILED DESCRIPTION

The converter circuit has a converter unit with a large number of drivable power semiconductor switches and is connected to a three-phase electrical AC voltage system. In the method according to the disclosure for operating the converter circuit, the drivable power semiconductor switches are now driven by means of a drive signal formed from a control signal, and the control signal is formed by adjusting an H-th harmonic component of system currents to a system current setpoint value, where H=1, 2, 3, . . . . According to the disclosure, the system current setpoint value is formed by adjusting an H-th harmonic component of system voltages to a predeterminable system voltage setpoint value, the control difference from the H-th harmonic component of the system voltages and the system voltage setpoint value being weighted by a system impedance determined with respect to the H-th harmonic component. Thus, the corresponding H-th harmonic component of the system voltages directly influences the formation of the system current setpoint value, with the result that the H-th harmonic component in the system voltages can advantageously be reduced to the desired degree. Since the system impedance typically changes over the course of time and this ultimately corresponds to a change in the control path, the controller involved in the adjustment needs to be matched or reset each time with respect to its controller parameter to the changed system impedance. As a result of the control difference being weighted by the system impedance, such matching or resetting of the controller parameters of the controller involved in the adjustment and therefore redesigning of the controller is advantageously superfluous since the system impedance now directly affects the input of the controller and therefore directly affects the adjustment.

The apparatus according to the disclosure for implementing the method for operating the converter circuit has a control apparatus which is used for generating the control signal SR and is connected to the drivable power semiconductor switches via a drive circuit for forming the drive signal, the control apparatus having a first controller unit for forming the control signal by adjusting the H-th harmonic component of the system currents to the system current setpoint value, where H=1, 2, 3, .... In accordance with the disclosure, the control apparatus now has a second controller unit for forming the system current setpoint value by adjusting the H-th harmonic component of the system voltages to the predeterminable system voltage setpoint value, the control difference from the H-th harmonic component of the system voltages and the system voltage setpoint value being weighted by the system impedance determined with respect to the H-th harmonic component. The apparatus according to the disclosure for implementing the method for operating the converter circuit can therefore be realized in a very simple and inexpensive manner, since the complexity involved with the circuitry can be kept extremely low and, in addition, only a small number of components is required for the design. The method according to the disclosure can therefore be implemented in a particularly simple manner by means of this apparatus.

FIG. 1 shows an exemplary embodiment of an apparatus according to the disclosure for implementing the method according to the disclosure for operating a converter circuit. As shown in FIG. 1, the converter circuit has a converter unit 2 with a large number of drivable power semiconductor switches and is connected to a three-phase electrical AC voltage system. It should be mentioned that the converter unit 2 can generally be in the form of any converter unit 2 for switching $\geq 2$ DC switching voltage levels (multi-level converter circuit). In the method according to the disclosure for operating the converter circuit, the drivable power semiconductor switches are driven by means of a drive signal $S_A$ formed from a control signal $S_R$, and the control signal $S_R$ is formed by adjusting an H-th harmonic component of system currents $i_{NH}$ to a system current setpoint value $i_{NHref}$, where H=1, 2, 3, .... According to the disclosure, the system current setpoint value $i_{NHref}$ is formed by adjusting an H-th harmonic component of system voltages $u_{NH}$ to a predeterminable system voltage setpoint value $u_{NHref}$, the control difference $u_{NHdiff}$ from the H-th harmonic component of the system voltages $u_{NH}$ and the system voltage setpoint value $u_{NHref}$ being weighted by a system impedance $y_{NH}$ determined with respect to the H-th harmonic component. Thus, the corresponding H-th harmonic component of the system voltages $u_{NH}$ directly influences the formation of the system current setpoint value $i_{NHref}$, with the result that the H-th harmonic component in the system voltages can advantageously be reduced to the desired degree. As a result of the control difference $u_{NHdiff}$ being weighted by the system impedance $y_{NH}$, matching or resetting of the controller parameters of the controller involved in the adjustment and therefore redesigning of the controller owing to a system impedance $y_{NH}$ which typically changes over time is advantageously superfluous since the system impedance $y_{NH}$ now directly affects the input of the controller and therefore directly affects the adjustment.

Figure 3:
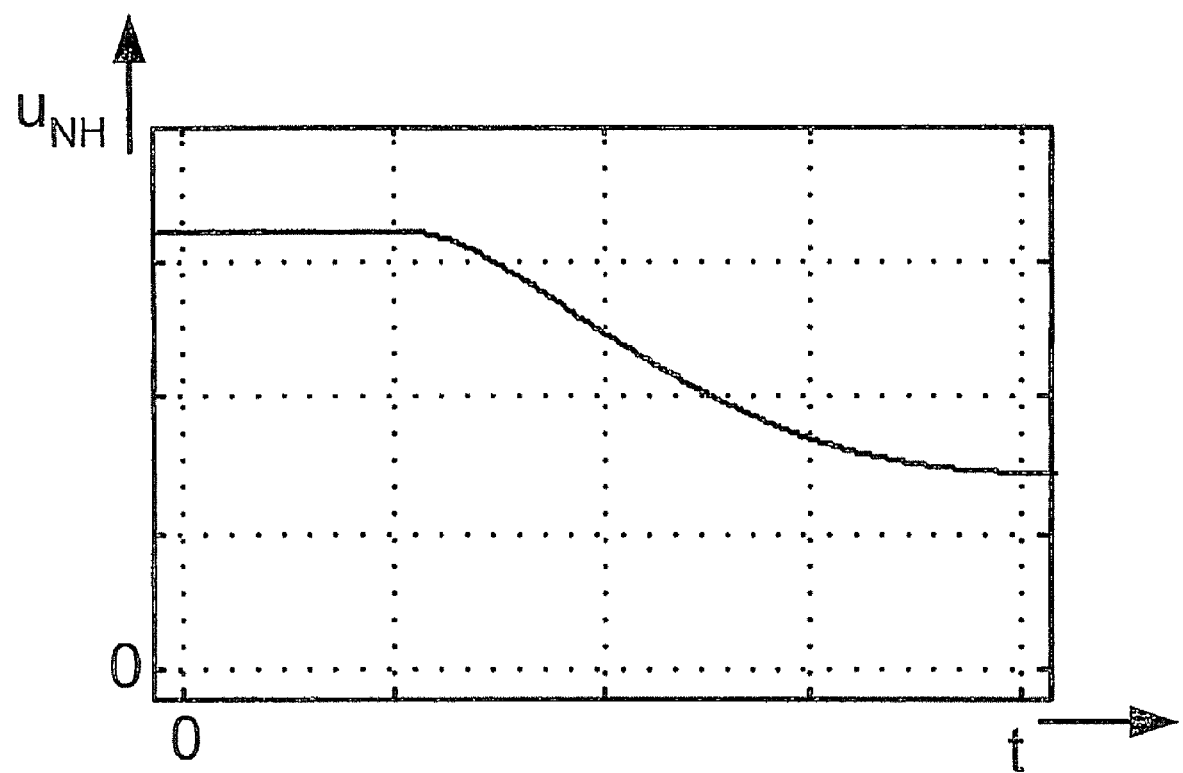
FIG. 3 shows a time profile for the absolute value of an H-th harmonic component of system voltages.

A time profile of the absolute value of an H-th harmonic component of system voltages UNH is illustrated in FIG. 3, which shows a marked reduction in the H-th harmonic component over time t.

Since the system impedance $y_{NH}$ can typically change over the course of time, with respect to the H-th harmonic component, the absolute value of the system voltage change $|\Delta_{uNH}|$ can be monitored in relation to a threshold value $u_{NHTol}$. Each time the threshold value $u_{NHTol}$ is exceeded, the system impedance $y_{NH}$ is then redetermined. In order to determine the system impedance $y_{NH}$, for example the present system voltage change $\Delta u_{NH}$ with respect to the H-th harmonic component and a present system current change $\Delta i_{NH}$ with respect to the H-th harmonic component is ascertained, and then the system impedance $y_{NH}$ is determined from this by means of computation. It should be mentioned that other possible ways of determining the system impedance $y_{NH}$, such as measurement, for example, would also be conceivable.

The H-th harmonic component of the system voltages $u_{NH}$ can be formed from the Park-Clarke transformation of the system voltages $u_{Nd}$, $u_{Nq}$. $u_{Nd}$ and $u_{Nq}$ are the corresponding components of the Park-Clarke transformation of the system voltages.

It should be mentioned that the Park-Clarke transformation is generally defined by $$\bar{x} = (x_d + jx_q)e^{j\omega t},$$

where $\bar{x}$ is generally a complex variable, $x_d$ is the d component of the Park-Clarke transformation of the variable $\bar{x}$ and $x_q$ is the q component of the Park-Clarke transformation of the variable $\bar{x}$. Advantageously, not only the fundamental of the complex variable $\bar{x}$ is transformed in the Park-Clarke transformation, but also all of the harmonic components of the complex variable $\bar{x}$ which arise. The H-th harmonic component is therefore also included and can be extracted by simple filtering.

With respect to the method according to the disclosure, the Park-Clarke transformation of the system voltages $u_{Nd}$, $u_{Nq}$ is advantageously formed from the space vector transformation of the system voltages $u_{N\alpha}$, $u_{N\beta}$, i.e. the system voltages $u_{Na}$, $u_{Nb}$, $u_{Nc}$ are transformed by the space vector transformation.

It should be mentioned that the space vector transformation is defined as follows $$\bar{x} = x_\alpha + jx_\beta$$

where $\bar{x}$ is generally a complex variable, $x_\alpha$ is the $\alpha$ component of the space vector transformation of the variable $\bar{x}$ and $x_\beta$ is the $\beta$ component of the space vector transformation of the variable $\bar{x}$.

The H-th harmonic component of the system currents $i_{NH}$ can be formed from the Park-Clarke transformation of the system currents $i_{Nd}$, $i_{Nq}$. $i_{Nd}$ and $i_{Nq}$ are the corresponding components of the Park-Clarke transformation of the system currents. In addition, the Park-Clarke transformation of the system currents $i_{Nd}$, $i_{Nq}$ is formed from the space vector transformation of the system currents $i_{N\alpha}$, $i_{N\beta}$, i.e. the system currents $i_{Na}$, $i_{Nb}$, $i_{Nc}$ are transformed by the space vector transformation.

The adjustment of the H-th harmonic component of the system voltages $u_{NH}$ to the predeterminable system voltage setpoint value $u_{NHref}$ already mentioned above can take place in accordance with a proportional/integral characteristic, since said characteristic is characterized by its simplicity. Alternatively, however, it is also conceivable for the adjustment of the H-th harmonic component of the system voltages $u_{NH}$ to the predeterminable system voltage setpoint value $u_{NHref}$ to take place in accordance with a dead-beat characteristic by means of iteration. In the adjustment in accordance with the dead-beat characteristic by means of iteration, the following formula can be used for the formation:

$$i_{NHref} = i_{NHref,old} + (u_{NH} - u_{NHref}) \cdot y_{NH} \cdot k,$$

where the system current setpoint value $i_{NHref}$ is reformed in each iteration step and $i_{NHref,old}$ is the system current setpoint value of the preceding iteration step and k is a correction factor, which is advantageously selected to be of the order of magnitude of 0.1 to 1. It should be mentioned, however, that any other control characteristic would also be conceivable.

Figure 2:
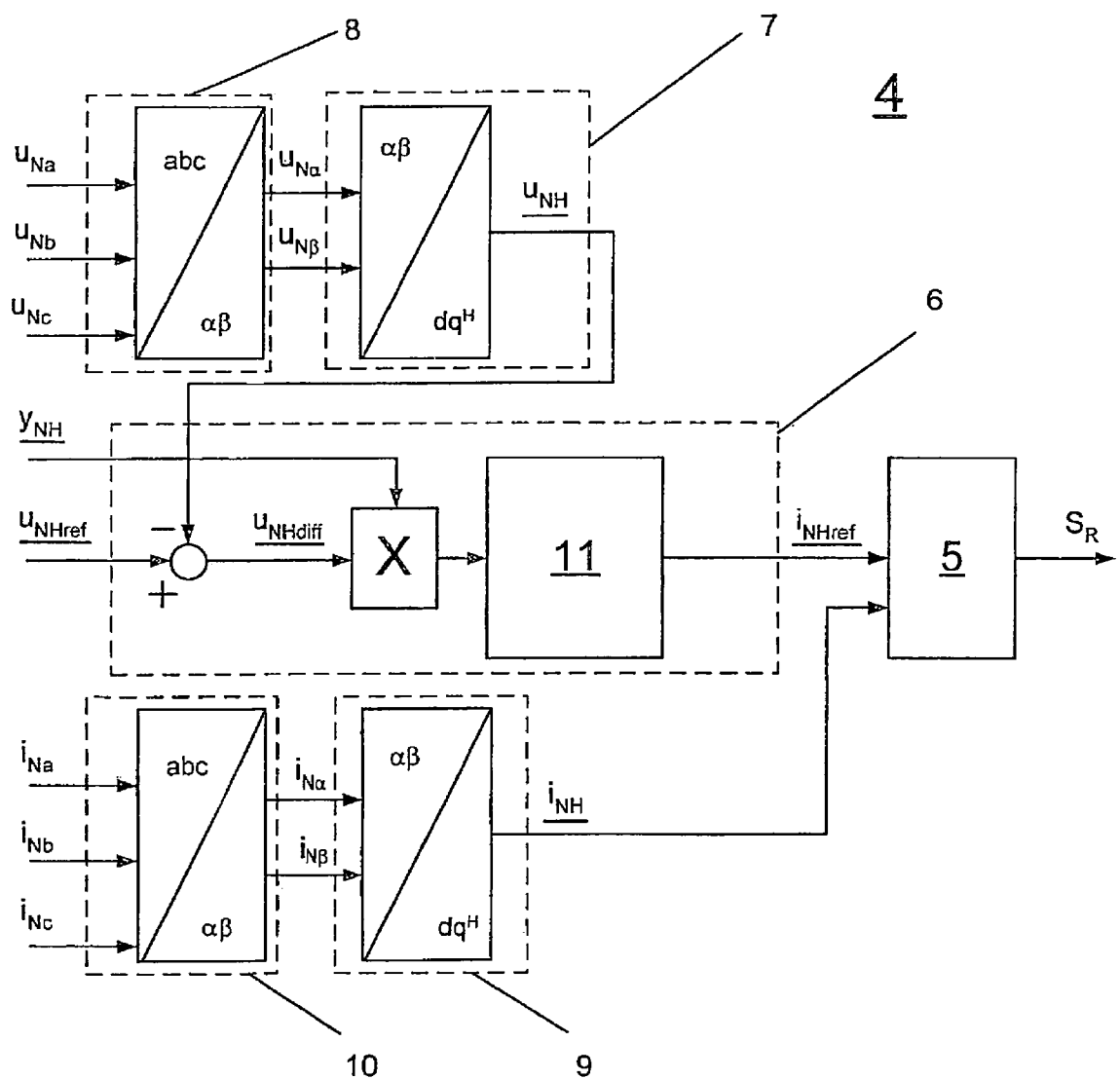
FIG. 2 shows an exemplary embodiment of a control apparatus according to the disclosure.

As has already been mentioned, FIG. 1 shows an exemplary embodiment of an apparatus according to the disclosure for implementing the method according to the disclosure for operating a converter circuit. As shown in FIG. 1, the control apparatus 4 used for generating the control signal $S_R$ is connected to the drivable power semiconductor switches of the converter unit 2 via a drive circuit 3 for forming the drive signal $S_A$. FIG. 2 illustrates an exemplary embodiment of a control apparatus 4 according to the disclosure, with the control apparatus 4 having a first controller unit 5 for forming the control signal $S_R$ by adjusting the H-th harmonic component of the system currents $i_{NH}$ to the system current setpoint value NHref, where H=1, 2, 3, .... According to the disclosure, the control apparatus 4 has a second controller unit 6 for forming the system current setpoint value $i_{NHref}$ by adjusting the H-th harmonic component of the system voltages $u_{NH}$ to the predeterminable system voltage setpoint value $u_{NHref}$, the control difference $u_{NHdiff}$ from the H-th harmonic component of system voltages $u_{NH}$ and the system voltage setpoint value $u_{NHref}$ being weighted by the system impedance $y_{NH}$ determined with respect to the H-th harmonic component.

The second controller unit 6 for adjusting the H-th harmonic component of the system voltages $u_{NH}$ to the predeterminable system voltage setpoint value $u_{NHref}$ comprises, in accordance with FIG. 2, a controller 11, which controller 11 can be in the form of, for example, a proportional/integral controller with a corresponding characteristic (already mentioned) or in the form of a dead-beat controller with a corresponding characteristic (already mentioned). It should be mentioned, however, that any other controller with its corresponding control characteristic would also be conceivable.

In accordance with FIG. 2, the control apparatus 4 additionally has a first computation unit 7 for forming the Park-Clarke transformation of the system voltages $u_{Nd}$, $u_{Nq}$ from the space vector transformation of the system voltages $u_{N\alpha}$, $u_{N\beta}$ and for forming the H-th harmonic component of the system voltages $u_{NH}$ from the Park-Clarke transformation of the system voltages $u_{Nd}$, $u_{Nq}$.

In addition, the control apparatus 4, in accordance with FIG. 2, has a second computation unit 8 for forming the space vector transformation of the system voltages $u_{N\alpha}$, $u_{N\beta}$. In addition, the control apparatus 4 comprises a third computation unit 9 for forming the Park-Clarke transformation of the system currents $i_{Nd}$, $i_{Nq}$ from the space vector transformation of the system currents $i_{N\alpha}$, $i_{N\beta}$ and for forming the H-th harmonic component of the system currents $i_{NH}$ from the Park-Clarke transformation of the system currents $i_{Nd}$, $i_{N}$. The control apparatus 4 furthermore has a fourth computation unit 10 for forming the space vector transformation of the system currents $i_{N\alpha}$, $i_{N\beta}$.

The method described in detail above and the associated apparatus for implementing the method causes an H-th harmonic component of the system voltages $u_{NH}$ to be reduced. It goes without saying that, in order to reduce, for example, a plurality of harmonic components of the system voltages, the abovementioned method with the corresponding method steps is implemented separately for each of these harmonic components. As regards the apparatus for implementing the method, in order to reduce the harmonic components, an associated apparatus as described above is therefore required for each of these harmonic components.

All of the steps of the method according to the disclosure can be implemented as software, with said software then being loaded onto a computer system, in particular with a digital signal processor, for example, and can be run on said computer system. In addition, the apparatus according to the disclosure which is described in detail above can also be implemented in a computer system, in particular in a digital signal processor.

Overall, it has been possible to demonstrate that the apparatus according to the disclosure, in particular that shown in FIG. 1 and FIG. 2, for implementing the method according to the disclosure for operating the converter circuit can be realized in a very simple and cost-effective manner since the complexity involved with the circuitry is extremely low and in addition only a small number of components is required for the design. The method according to the disclosure can therefore be implemented in a particularly simple manner using this apparatus.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of reference symbols | |
|---|---|
| 1 | Electrical AC voltage system |
| 2 | Converter unit |
| 3 | Drive circuit |
| 4 | Control apparatus |
| 5 | First controller unit |
| 6 | Second controller unit |
| 7 | First computation unit |
| 8 | Second computation unit |
| 9 | Third computation unit |
| 10 | Fourth computation unit |
| 11 | Controller |

What is claimed is:

1. A method for operating a converter circuit, the converter circuit having a converter unit with a large number of drivable power semiconductor switches and with a three-phase electrical AC voltage system, the method comprising:

driving the drivable power semiconductor switches by means of a drive signal ($S_A$) formed from a control signal (($S_R$);

forming the control signal ($S_R$) by adjusting an H-th harmonic component of system currents ($i_{NH}$) to a system current setpoint value ($i_{NHref}$), where H=1, 2, 3, . . . ; and forming the system current setpoint value ($i_{NHref}$) by adjusting an H-th harmonic component of system voltages ($u_{NH}$) to a predeterminable system voltage setpoint value ($u_{NHref}$), the control difference ($u_{NHdiff}$) from the H-th harmonic component of the system voltages ($u_{NH}$) and the system voltage setpoint value ($u_{NHref}$) being weighted by a system impedance ($y_{NH}$) determined with respect to the H-th harmonic component.

2. The method as claimed in claim 1, wherein, with respect to the H-th harmonic component, the absolute value of the system voltage change ($|\Delta u_{NH}|$) towards a threshold value ($u_{NHTol}$) is monitored, and wherein each time the threshold value ($u_{NHTol}$) is exceeded, the system impedance ($y_{NH}$) is determined.

3. The method as claimed in claim 2, wherein the system impedance ($y_{NH}$) is determined from the system voltage change ($\Delta u_{NH}$) with respect to the H-th harmonic component and from a system current change ($\Delta i_{NH}$).

4. The method as claimed in claim 3, wherein the H-th harmonic component of the system voltages ($u_{NH}$) is formed from the Park-Clarke transformation of the system voltages ($u_{Nd}$, $u_{Nq}$).

5. The method as claimed in claim 1, wherein the H-th harmonic component of the system voltages ($u_{NH}$) is formed from the Park-Clarke transformation of the system voltages ($u_{Nd}$, $u_{Nq}$).

6. The method as claimed in claim 5, wherein the Park-Clarke transformation of the system voltages ($u_{Nd}$, $u_{Nq}$) is formed from the space vector transformation of the system voltages ($u_{N\alpha}$, $u_{N\beta}$).

7. The method as claimed in claim 6, wherein the H-th harmonic component of the system currents ($i_{NH}$) is formed from the Park-Clarke transformation of the system currents ($i_{Nd}$, $i_{Nq}$).

8. The method as claimed in claim 1, wherein the H-th harmonic component of the system currents ($i_{NH}$) is formed from the Park-Clarke transformation of the system currents ($i_{Nd}$, $i_{Nq}$).

9. The method as claimed in claim 8, wherein the Park-Clarke transformation of the system currents ($i_{Nd}$, $i_{Nq}$) is formed from the space vector transformation of the system currents ($i_{N\alpha}$, $i_{N\beta}$).

10. The method as claimed in claim 9, wherein the adjustment of the H-th harmonic component of the system voltages ($u_{NH}$) to the predeterminable system voltage setpoint value ($u_{NHref}$) takes place in accordance with a proportional/integral characteristic.

11. The method as claimed in claim 9, wherein the adjustment of the H-th harmonic component of the system voltages ($u_{NH}$) to the predeterminable system voltage setpoint value ($u_{NHref}$) takes place in accordance with a dead-beat characteristic by means of iteration.

12. The method as claimed in claim 1, wherein the adjustment of the H-th harmonic component of the system voltages ($u_{NH}$) to the predeterminable system voltage setpoint value ($u_{NHref}$) takes place in accordance with a proportional/integral characteristic.

13. The method as claimed in claim 1, wherein the adjustment of the H-th harmonic component of the system voltages ($u_{NH}$) to the predeterminable system voltage setpoint value ($u_{NHref}$) takes place in accordance with a dead-beat characteristic by means of iteration.

14. An apparatus for implementing a method for operating a converter circuit, the converter circuit having a converter unit with a large number of drivable power semiconductor switches and being connected to a three-phase electrical AC voltage system, with a control apparatus, which is used to generate a control signal ($S_R$) and is connected to the drivable power semiconductor switches via a drive circuit for forming a drive signal ($S_A$), the control apparatus (4) having a first controller unit for forming the control signal ($S_R$) by adjusting an H-th harmonic component of system currents ($i_{NH}$) to a system current setpoint value ($i_{NHref}$), where H=1, 2, 3, . . . , wherein the control apparatus has a second controller unit for forming the system current setpoint value ($i_{NHref}$) by adjusting an H-th harmonic component of system voltages ($u_{NH}$) to a predeterminable system voltage setpoint value ($u_{NHref}$), the control difference ($u_{NHdiff}$) from the H-th harmonic component of the system voltages ($u_{NH}$) and the system voltage setpoint value ($u_{NHref}$) being weighted by a system impedance ($y_{NH}$) determined with respect to the H-th harmonic component.

15. The apparatus as claimed in claim 14, wherein the control apparatus (4) has a first computation unit for forming the Park-Clarke transformation of the system voltages ($u_{Nd}$, $u_{Nq}$) from the space vector transformation of the system voltages ($u_{N\alpha}$, $u_{N\beta}$) and forming the H-th harmonic component of the system voltages ($u_{NH}$) from the Park-Clarke transformation of the system voltages ($u_{Nd}$, $u_{Nq}$).

16. The apparatus as claimed in claim 15, wherein the control apparatus has a second computation unit for forming the space vector transformation of the system voltages ($u_{N\alpha}$, $u_{N\beta}$).

17. The apparatus as claimed in claim 16, wherein the control apparatus has a third computation unit for forming the Park-Clarke transformation of the system currents ($i_{Nd}$, $i_{Nq}$) from the space vector transformation of the system currents ($i_{N\alpha}$, $i_{N\beta}$) and forming the H-th harmonic component of the system currents ($i_{NH}$) from the Park-Clarke transformation of the system currents ($i_{Nd}$, $i_{Nq}$).

18. The apparatus as claimed in claim 14, wherein the control apparatus has a third computation unit for forming the Park-Clarke transformation of the system currents ($i_{Nd}$, $i_{Nq}$) from the space vector transformation of the system currents ($i_{N\alpha}$, $i_{N\beta}$) and forming the H-th harmonic component of the system currents ($i_{NH}$) from the Park-Clarke transformation of the system currents ($i_{Nd}$, $i_{Nq}$).

19. The apparatus as claimed in claim 18, wherein the control apparatus has a fourth computation unit for forming the space vector transformation of the system currents ($i_{N\alpha}$, $i_{N\beta}$).

20. The apparatus as claimed in claim 19, wherein the second controller unit for adjusting the H-th harmonic component of the system voltages ($u_{NH}$) to the predeterminable system voltage setpoint value ($u_{NHref}$) comprises a controller.

21. The apparatus as claimed in claim 14, wherein the second controller unit for adjusting the H-th harmonic component of the system voltages ($u_{NH}$) to the predeterminable system voltage setpoint value ($u_{NHref}$) comprises a controller.

* * * * *